United States Patent [19]

Hahn et al.

[11] 4,369,227

[45] Jan. 18, 1983

[54] PARTICULATE STYRENE POLYMERS CONTAINING BLOWING AGENT

[75] Inventors: Klaus Hahn, Lampertheim; Hans P. Rath; Heinz Krapf, both of Gruenstadt; Isidoor De Grave, Wachenheim; Manfred Walter, Speyer, all of Fed. Rep. of Germany

[73] Assignee: BASF Aktiengesellschaft, Fed. Rep. of Germany

[21] Appl. No.: 356,308

[22] Filed: Mar. 10, 1982

[30] Foreign Application Priority Data

Aug. 8, 1980 [DE] Fed. Rep. of Germany ....... 3030053

[51] Int. Cl.³ .............................................. C08J 9/22
[52] U.S. Cl. ................................... 428/407; 427/222; 428/318.4; 521/57; 521/88; 521/97; 521/146
[58] Field of Search ............................. 428/407, 318.4; 427/222; 521/57, 88, 97, 146

[56] References Cited

U.S. PATENT DOCUMENTS

| | | | |
|---|---|---|---|
| 2,989,782 | 6/1961 | Barkhuff, Jr. et al. | 521/57 |
| 3,480,570 | 11/1969 | Roberts et al. | 521/57 |
| 3,637,538 | 1/1972 | Heald | 521/57 |
| 3,789,028 | 1/1974 | Heiskel et al. | 521/57 |
| 4,238,570 | 12/1980 | Shibata et al. | 521/57 |

FOREIGN PATENT DOCUMENTS 1408267 10/1975 United Kingdom ................. 521/57

OTHER PUBLICATIONS

"Chemical Abstracts", 89,130509w (1978).

*Primary Examiner*—Morton Foelak
*Attorney, Agent, or Firm*—Keil & Witherspoon

[57] ABSTRACT

Particulate styrene polymers which contain a blowing agent and are surface-coated with from 0.05 to 1% by weight of an ester. The coating agent is a hydroxycarboxylic acid ester, or an ester of a carboxylic acid with an oxyalkylated alcohol; tristearyl citrate is a preferred ester.

The styrene polymers can be used to produce foam moldings, with short mold dwell times and good welding of the foam particles.

4 Claims, No Drawings

PARTICULATE STYRENE POLYMERS CONTAINING BLOWING AGENT

This is a continuation, of application Serial No. 286,662, filed July 24, 1981.

The present invention relates to particulate styrene polymers which contain blowing agent and which, on conversion to foam moldings, exhibit short mold dwell times and good welding of the individual foam particles.

The production of moldings from foamed styrene polymers is well-known. In a method which has proved useful in industry, the foamable polymer particles, containing blowing agent, are initially heated, in a first process step, to above their softening point until they have foamed to produce a loose mass having the desired bulk density; this treatment is referred to as prefoaming. To ensure good processability, sintering of the individual particles to form larger aggregates must not occur during prefoaming, since such sintering would interfere with the conveying of the prefoamed material and with mold filling. The prefoamed particles are next stored for several hours and are then foamed further in a perforated pressure-resistant mold, by renewed heating with live steam, which causes them to weld to form a molding having dimensions corresponding to the mold cavity; this second step is referred to as molding. Thereafter, the molding must cool within the mold, and sufficient time must be allowed for even the interior of the molding to drop below the softening point of the styrene polymer. If the molding is prematurely removed from the mold it can distort or collapse. Long cooling times of course add to the production costs and there have therefore been many attempts to reduce the mold dwell time.

U.S. Pat. No. 3,789,028 proposes coating expandable polystyrene particles with glycerol esters of higher fatty acids. These do indeed substantially reduce the mold dwell time. British Pat. No. 1,408,267 proposes additionally coating the particles with a finely divided inorganic solid, to reduce the tendency to agglomerate. However, it has been found that polystyrene particles containing blowing agent and coated with glycerol esters give foam moldings in which the welding of the individual foam particles is not very good.

It is an object of the present invention to provide particulate styrene polymers which contain blowing agent, do not tend to agglomerate, and require only short mold dwell times for conversion to foam moldings, whilst nevertheless giving good welding of the foam particles.

We have found that this object is achieved, according to the invention, if the particles are surface-coated with from 0.05 to 1% by weight of a hydroxycarboxylic acid ester or of an ester of a carboxylic acid with an oxyalkylated alcohol. The minimum mold dwell time is from 20 to 50% shorter than with the conventional coating agents based on glycerol esters, and substantially better welding is achieved. The foam moldings exhibit uniform density distribution and good dimensional stability.

For the purpose of the invention, styrene polymers are polystyrene and copolymers of not less than 50 parts by weight of styrene with other $\alpha,\beta$-olefinically unsaturated compounds. Examples of suitable comonomers are $\alpha$-methylstyrene, nuclear-halogenated styrenes, nuclear-alkylated styrenes, acrylonitrile, esters of acrylic acid or methacrylic acid with alcohols of 1 to 8 carbon atoms, N-vinyl compounds, eg. vinylcarbazole, maleic anhydride and also small amounts of compounds which contain two polymerizable double bonds, such as butadiene, divinylbenzene or butanediol diacrylate.

The particulate styrene polymers are prepared by conventional methods. They can be obtained in bead form, in the form of cylindrical granules or in the form of lumps such as result from milling mass-polymerized material. The particles advantageously have diameters of from 0.1 to 6 mm, especially from 0.4 to 3 mm.

One or more blowing agents are present in homogeneous dispersion in the styrene polymers. Examples of suitable blowing agents are hydrocarbons and halohydrocarbons which are gaseous or liquid at S.T.P., do not dissolve the styrene polymer and boil below the softening point of the polymer. Specific examples are propane, butane, pentane, cyclopentane, hexane, cyclohexane, dichlorodifluoromethane and trifluorochloromethane. The styrene polymer in general contains from 3 to 15 percent by weight of blowing agent.

According to the invention, the particulate styrene polymers are coated with from 0.05 to 1, preferably from 0.1 to 0.5, % by weight of the esters. Preferred esters are those of hydroxycarboxylic acids of 2 to 30, preferably 3 to 6, carbon atoms, having from 1 to 10, preferably from 1 to 4, carboxyl groups and from 1 to 5, preferably from 1 to 3, hydroxyl groups, with alcohols of 5 to 50, preferably 10 to 20, carbon atoms or with oxyalkylated alcohols of 10 to 50 carbon atoms. Particularly suitable hydroxycarboxylic acids are citric acid and tartaric acid, as well as lactic acid, glycolic acid and malic acid.

Other preferred esters are those of carboxylic acids of 2 to 30, preferably of 8 to 20, carbon atoms with oxyalkylated, preferably oxyethylated, alcohols of 10 to 50 carbon atoms. These alcohols can readily be prepared by reacting an alcohol such as stearyl alcohol or cetyl alcohol with, preferably, from 1 to 5 moles of an alkylene oxide, especially ethylene oxide.

The novel esters are prepared by conventional methods, for example by reacting the carboxylic acid with the alcohol.

The coating on the styrene polymer particles can contain, in addition to the esters according to the invention, conventional agents for reducing the mold dwell time, for example glycerol esters, such as glycerol monostearate, or glycerol ethers, such as glycerol distearyl ether. A mixture of hydroxycarboxylic acid esters with glycerol esters in the weight ratio of from 5:1 to 1:5 gives particularly advantageous results.

The esters are present—at least predominantly—as a very uniformly distributed coating on the surface of the expandable polystyrene particles. The method of application of the coating is not critical; for example, simple tumbling of the finely divided ester with the styrene polymer particles in a commercial mixer may be used. However, it is also possible to apply the ester from an aqueous dispersion or a solution in an organic solvent, in which case the solvent or water must be removed during application. It is also possible to add the esters to the styrene bead polymerization charge at or towards the end of the suspension polymerization process.

The styrene polymers can also contain other additives, to impart specific properties to the expandable products. Examples include flameproofing agents based on organic bromine compounds or chlorine compounds, eg. tris-dibromopropyl phosphate, hexabromocyclododecane, chloroparaffin and synergistic agents to use with flameproofing agents, eg. dicumyl and easily decomposable organic peroxides; others include antistatic agents, stabilizers, dyes, lubricants, fillers and materials which act as non-stick agents during prefoaming, such as zinc stearate, melamine-formaldehyde condensates or silica. Depending on the desired effect, the additives can be homogeneously dispersed in the particles or be in the form of a surface coating.

The novel particulate styrene polymers containing blowing agent can be foamed, by conventional methods, to give foam moldings with densities of from 5 to 100 g/l. The minimum mold dwell time (MDT) is determined by the following method: the prefoamed styrene polymer particles are welded in a mold, by treatment with steam, to give a molding in the center of which is located a pressure sensor. The time from the start of cooling up to when the pressure in the interior of the molding has dropped to 1.05 bar is determined. Experience has shown that at this pressure the moldings can be safely released.

To assess the welding, 5 cm thick foam samples which have been stored for one day are broken over an edge. The ratio of the particles which are thereby torn to all particles visible in the fracture surface is estimated and quoted in percent. A result of 0% means that the adhesion of the particles to one another is less than the inherent strength of the particles, whilst 100% means that only torn particles can be seen.

EXAMPLE

Expandable polystyrene containing 6.4% by weight of n-pentane and having a mean particle diameter of 1.5 mm was coated, by tumbling in a paddle mixer, with various substances plus, in each case, 0.02% of zinc stearate. The polystyrene particles were then prefoamed in a continuous stirred prefoamer to a bulk density of 15 g/l by treatment with a stream of steam, after which they were stored for 24 hours and then welded in a mold, by treatment with steam under a pressure of 1.8 bar for 20 seconds, to give a block. The measured minimum mold dwell times and the welding percentages are shown in the Table.

TABLE 1

Comparison of gycerol monostearate and alkyl hydroxycarboxylates as coating agents for expandable polystyrene

| Carboxylic acid ester | % by weight | | | | | | |
|---|---|---|---|---|---|---|---|
| Gylcerol monostearate | 0.4 | — | 0.2 | — | 0.2 | — | 0.2 |
| Tricetyl citrate | — | 0.4 | 0.2 | — | — | — | — |
| Tristearyl citrate | — | — | — | 0.4 | — | — | — |
| Tristearyl lactate | — | — | — | — | 0.2 | — | — |
| Dilauryl tartrate | — | — | — | — | — | 0.4 | 0.2 |
| Minimum mold dwell time [min] | 38 | 90 | 21 | 28 | 27 | 30 | 31 |
| Welding, assessed by fracture [%] | 40 | 90 | 75 | 87 | 70 | 65 | 61 |

TABLE 2

Comparison of glycerol monostearate and carboxylic acid esters of oxyalkylated alcohols

| Carboxylic acid ester obtained from | | % by weight | | | | | | | |
|---|---|---|---|---|---|---|---|---|---|
| Stearyl alcohol + 1 mole of EO[1] | Stearic acid | — | 0.4 | — | — | — | — | — | — |
| Stearyl alcohol + 3 moles of EO | Stearic acid | — | — | 0.4 | — | — | — | — | — |
| Cetyl alcohol + 2 moles of EO | Benzenetricarboxylic acid | — | — | — | 0.4 | — | — | — | 0.2 |
| Stearyl alcohol + 1 mole of EO | Citric acid | — | — | — | — | 0.4 | — | — | — |
| Stearyl alcohol + 1 mole of PO[2] | Lactic acid | — | — | — | — | — | 0.4 | — | — |
| Stearyl alcohol + 1 mole of EO | Tartaric acid | — | — | — | — | — | — | 0.4 | — |
| Glycerol monostearate | | 0.4 | — | — | — | — | — | — | 0.2 |
| Minimum mold dwell time [min] | | 38 | 27 | 24 | 21 | 25 | 31 | 29 | 29 |
| Welding, assessed by fracture [%] | | 40 | 70 | 75 | 90 | 79 | 54 | 51 | 47 |

[1]EO = ethylene oxide
[2]PO = propylene oxide

We claim:

1. A particulate styrene polymer, containing blowing agent, which is surface-coated with from 0.05 to 1% by weight of an ester of a hydroxycarboxylic acid having 3–6 carbon atoms with an alcohol having 10–20 carbon atoms.

2. A particulate styrene polymer, containing blowing agent, as claimed in claim 1, which is coated with a tristearyl citrate.

3. A particulate styrene polymer, containing blowing agent, as claimed in claim 1, which is coated with a mixture of a hydroxycarboxylic acid ester and a glycerol ester in the weight ratio of from 5:1 to 1:5.

4. A particulate styrene polymer, containing blowing agent, as claimed in claim 1, wherein said hydroxycarboxylic acid is citric acid and said alcohol has 10 to 20 carbon atoms.